Dec. 11, 1923.
F. E. AID
FASTENING DEVICE
Filed Sept. 13, 1921
1,477,232
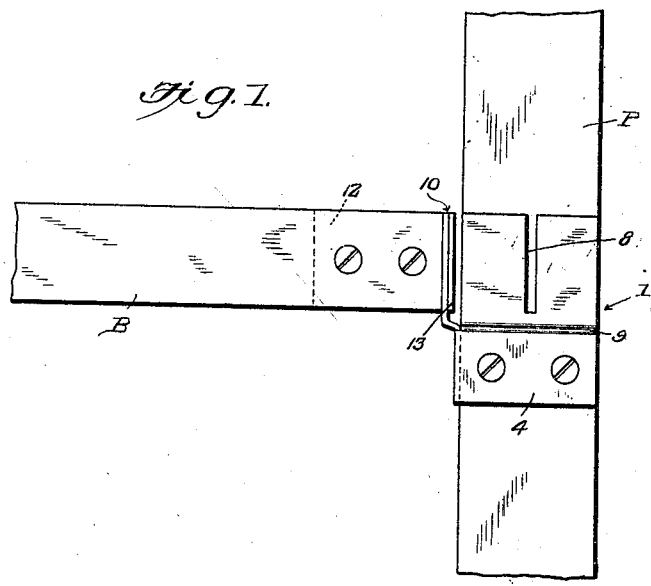
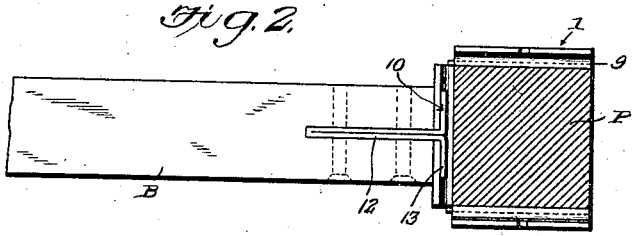
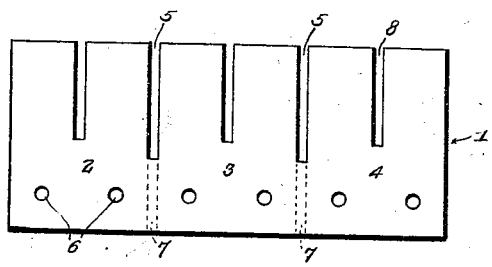
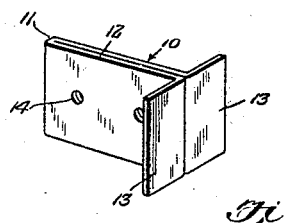
F. E. Aid
INVENTOR.
BY Geo. F. Kimmel
ATTORNEY.

Patented Dec. 11, 1923.

1,477,232

UNITED STATES PATENT OFFICE.

FRANK E. AID, OF CHILLICOTHE, OHIO.

FASTENING DEVICE.

Application filed September 13, 1921. Serial No. 501,219.

*To all whom it may concern:*

Be it known that I, FRANK E. AID, a citizen of the United States, residing at Chillicothe, in the county of Ross and State of Ohio, have invented certain new and useful Improvements in a Fastening Device, of which the following is a specification.

This invention relates to fastening devices for detachably connecting two members.

The object of the invention is to provide a simple, cheap and efficient fastener or connector for detachably connecting two members arranged at right angles to each other, such as a post and a lateral and which may be easily applied to the articles to be connected.

With these and other objects in view, the invention consists in certain novel features of construction as hereinafter shown, described and claimed.

In the accompanying drawings:

Figure 1 represents a side elevation of two members shown connected with this improved fastening device.

Fig. 2 is a plan view of the fastener with the upright shown in horizontal section.

Fig. 3 is a plan view of the blank from which one member of the fastener is constructed; and Fig. 4 is a perspective view of the other fastening member.

In the embodiment illustrated a post P is shown connected with a right angularly disposed bar B by means of the fastener constituting this invention. This fastener comprises a member 1, to be carried by the post P, and a cooperating member 10, to be carried by the bar B.

The member 1, as shown, is composed of three sections 2, 3 and 4, formed integral with each other, with their upper portions separated by cut-out portions or recesses 5, and each is equipped with a plurality of apertures 6 for the passage of the fastening elements.

The member 1, when it is to be fastened to a post P, rectangular in cross section, is bent at the dotted lines shown at 7 to adapt it to fit around three sides of the post, as shown clearly in Fig. 2. Each of the sections 2, 3 and 4 is slotted from its upper edge downwardly, as shown at 8, and this slotted upper portion of each section is offset laterally outward, as shown at 9, so that when the member 1 is applied to the post P or other support, the slotted upper portion will be spaced from the face of the post a sufficient distance to receive between them the cooperating fastening member 10, presently to be described. While the member 1 is here shown applied to three faces of the post P, obviously, one section only may be used and secured to one face only of the post, the construction here shown being stronger and adapting any one of the three faces to be connected with the bar B.

The fastening member 10, which is carried by the bar B, is T-shaped in form, being composed of a metal strip folded midway its ends, as shown at 11, with the members thereof contacting throughout the greater portion of their length to form a reinforced shank member 12, the ends 13 of said strip being bent laterally in opposite directions to form the head of the member 10 which is adapted to be inserted in the space between the offset upper portion of the fastener 1 and the adjacent face of the post P with which it is connected, the shank 12 extending laterally outward through the slot 8 in the member 1, as is shown clearly in Figs. 1 and 2.

The member 10 is applied to one end of the bar B by inserting the shank 12 thereof in a socket formed in said bar end, and is secured therein by suitable fastening elements preferably screws, which pass transversely through the bar and through apertures 14 formed in the shank 12 of member 10. This member 10 is so mounted in the bar that the head thereof projects slightly in advance of the end, preferably a distance corresponding to the thickness of the upper portion of the plate or member 1, in connection with which it is to be used, so that when said head is engaged with said member 1, as shown in Fig. 2, said member will occupy the space between the member 10 and the end of the bar B and prevent all wobbling or rattling of the parts.

From the above description, it will be obvious that this fastener which is constructed of any suitable strong metal, preferably sheet steel, may be easily applied to the parts to be connected and will permit them to be quickly attached or detached when desired.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:

1. A fastener of the class described, comprising a member having a plurality of outwardly lateral offsets disposed in angularly related planes said offsets being slotted, said slots extending through the free edges of said offsets, a cooperating fastening member composed of a strip of metal folded midway of its ends to form a shank and having the terminals thereof extending laterally in opposite directions to form a double thick head, adapted to enter a slot in the other member for detachably connecting said members.

2. A fastener of the class described comprising two members, one consisting of a plurality of integrally connected sections, each having apertures to receive attaching members and each slotted transversely to one end with the slotted portion thereof offset laterally outward, and a cooperating fastening member composed of a T-shaped metal strip folded centrally upon itself with the shank designed to be secured to the member to be connected and the head adapted to enter the slot in the cooperating fastening member.

3. The combination with an upright and a lateral to be connected, the lateral having a socket in one end, a T-shaped fastening member having the shank thereof inserted and secured in said socket with the head thereof projecting slightly beyond the end of the lateral, a metal plate bent to fit around said upright and provided with a plurality of transversely extending slots opening through the upper edge thereof, said slotted portion being offset laterally outward and cut away at the corners to adapt them to fit the upright, said slot being designed to receive the head of the lateral carried member.

In testimony whereof, I affix my signature hereto.

FRANK E. AID.